United States Patent
Peng et al.

(10) Patent No.: US 12,085,441 B2
(45) Date of Patent: Sep. 10, 2024

(54) METHOD FOR DETECTING INTENSITY OF AMBIENT LIGHT, AND ELECTRONIC DEVICE

(71) Applicant: SHENZHEN GOODIX TECHNOLOGY CO., LTD., Shenzhen (CN)

(72) Inventors: Quan Peng, Shenzhen (CN); Shun Li, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/064,484

(22) Filed: Dec. 12, 2022

(65) Prior Publication Data

US 2023/0341258 A1    Oct. 26, 2023

Related U.S. Application Data

(63) Continuation of application No. PCT/CN2022/088559, filed on Apr. 22, 2022.

(51) Int. Cl.
| | | |
|---|---|---|
| G01J 1/42 | (2006.01) | |
| G01J 1/44 | (2006.01) | |
| G09G 3/20 | (2006.01) | |

(52) U.S. Cl.
CPC ............ *G01J 1/4204* (2013.01); *G01J 1/44* (2013.01); *G09G 3/2074* (2013.01); *G01J 2001/444* (2013.01); *G09G 2300/0452* (2013.01); *G09G 2320/041* (2013.01); *G09G 2360/144* (2013.01); *G09G 2360/16* (2013.01)

(58) Field of Classification Search
CPC ...... G01J 1/4204; G01J 1/44; G01J 2001/444; G09G 3/2074; G09G 2360/144; G09G 2360/16

See application file for complete search history.

(56) References Cited

U.S. PATENT DOCUMENTS 11,629,994 B1 *  4/2023  Zhou ........................ G09G 5/10
                                                    345/207
2018/0322832 A1 * 11/2018  Zhao ..................... G09G 3/3607

FOREIGN PATENT DOCUMENTS

| CN | 107945770 A | 4/2018 |
|---|---|---|
| CN | 107957294 A | 4/2018 |

(Continued)

*Primary Examiner* — Georgia Y Epps
*Assistant Examiner* — Don J Williams
(74) *Attorney, Agent, or Firm* — Emerson, Thomson & Bennett, LLC; Roger D. Emerson; Matt J. Wilson

(57) ABSTRACT

An electronic device and a method for detecting an intensity of ambient light are provided. The method includes: sensing a light intensity of incident light, wherein the incident light includes ambient light passed through the display screen and light leaked from the display screen; obtaining an estimated light intensity of the light leaked from the display screen based on display data of a target region of the display screen; computing based on the estimated light intensity and a temperature compensation coefficient corresponding to a current temperature of the display screen, to obtain a light intensity of the light leaked from the display screen; and obtaining a light intensity of the ambient light passed through the display screen based on the light intensity of the incident light and the light intensity of the light leaked from the display screen.

20 Claims, 6 Drawing Sheets

(56) References Cited

FOREIGN PATENT DOCUMENTS

| CN | 112289280 A | 1/2021 |
|----|-------------|--------|
| CN | 112599089 A | 4/2021 |

* cited by examiner

METHOD FOR DETECTING INTENSITY OF AMBIENT LIGHT, AND ELECTRONIC DEVICE

CROSS-REFERENCE TO RELATED APPLICATIONS

This application is a continuation of International Application No. PCT/CN2022/088559, filed on Apr. 22, 2022, and entitled "METHOD FOR DETECTING INTENSITY OF AMBIENT LIGHT, AND ELECTRONIC DEVICE", the disclosure of which is hereby incorporated by reference in its entirety.

TECHNICAL FIELD

Embodiments of the present disclosure relate to the technical field of optics, and in particular to, a method for detecting an intensity of ambient light and an electronic device.

BACKGROUND

An electronic device, such as a mobile phone and a tablet, adjusts the brightness or color of its display screen based on ambient light, to provide more outstanding display effects. An intensity of the ambient light is obtained by an ambient light sensor. With the development of electronic devices, display screens of the electronic devices account for increasingly higher proportions, electronic devices with full screen design have emerged, and ambient light sensors are provided below the display screens. Therefore, light sensed by the ambient light sensor below the display screen not only includes the ambient light, but also includes light emitted from the display screen, thereby resulting in inaccurate intensity of the ambient light collected by the ambient light sensor. Therefore, how to obtain an accurate intensity of the ambient light has become a problem to be urgently solved.

SUMMARY

In view of this, one of the technical problems to be solved by embodiments of the present disclosure is to provide a method for detecting an intensity of ambient light and an electronic device, to improve the accuracy of an intensity of ambient light obtained by an ambient light sensor below a screen.

In a first aspect, a method for detecting an intensity of ambient light applicable to an ambient light sensor is provided, where the ambient light sensor is provided below a display screen. The detection method includes: sensing a light intensity of incident light, where the incident light includes ambient light passed through the display screen and light leaked from the display screen; obtaining an estimated light intensity of the light leaked from the display screen based on display data of a target region of the display screen; computing based on the estimated light intensity and a temperature compensation coefficient corresponding to a current temperature of the display screen, to obtain a light intensity of the light leaked from the display screen; and obtaining a light intensity of the ambient light passed through the display screen based on the light intensity of the incident light and the light intensity of the light leaked from the display screen.

In another implementation of the present disclosure, the computing based on the estimated light intensity and the temperature compensation coefficient corresponding to the current temperature of the display screen includes: multiplying the estimated light intensity by the temperature compensation coefficient.

In another implementation of the present disclosure, the display data of the target region of the display screen includes: a gray scale value of a display pixel of the target region.

In another implementation of the present disclosure, the display pixel of the target region of the display screen includes: a red sub-pixel, a green sub-pixel, and a blue sub-pixel; the display data of the target region of the display screen includes: a gray scale value of the red sub-pixel, a gray scale value of the green sub-pixel, and a gray scale value of the blue sub-pixel; and the temperature compensation coefficients include: a temperature compensation coefficient of the red sub-pixel, a temperature compensation coefficient of the green sub-pixel, and a temperature compensation coefficient of the blue sub-pixel.

In another implementation of the present disclosure, the temperature compensation coefficient of the red sub-pixel, the temperature compensation coefficient of the green sub-pixel, and the temperature compensation coefficient of the blue sub-pixel are stored in a lookup table.

In another implementation of the present disclosure, all gray scale values of the red sub-pixel correspond to a same lookup table of the temperature compensation coefficients.

In another implementation of the present disclosure, different gray scale values of the red sub-pixel correspond to different lookup tables of the temperature compensation coefficients.

In another implementation of the present disclosure, a group of gray scale values of the red sub-pixel correspond to a same lookup table of the temperature compensation coefficients.

In another implementation of the present disclosure, the obtaining the temperature compensation coefficients includes: obtaining luminous intensities of the display screen at a plurality of preset temperatures, wherein the display screen is in a state free from influence of the ambient light; and determining temperature compensation coefficients corresponding to the preset temperatures with one of the plurality of preset temperatures as a reference and based on the luminous intensities of the display screen at the preset temperatures.

In a second aspect, a method for detecting an intensity of ambient light applicable to an ambient light sensor is provided, where the ambient light sensor is provided below a display screen. The detection method includes: sensing a light intensity of incident light, where the incident light includes ambient light passed through the display screen and light leaked from the display screen; obtaining compensated display data based on display data of a target region of the display screen and a current temperature; computing based on the compensated display data, to obtain a light intensity of the light leaked from the display screen; and obtaining a light intensity of the ambient light passed through the display screen based on the light intensity of the incident light and the light intensity of the light leaked from the display screen.

In another implementation of the present disclosure, the display pixel of the target region of the display screen includes: a red sub-pixel, a green sub-pixel, and a blue sub-pixel; and the display data of the target region of the display screen includes: a gray scale value of the red sub-pixel, a gray scale value of the green sub-pixel, and a gray scale value of the blue sub-pixel.

In another implementation of the present disclosure, the obtaining the compensated display data based on the display data of the target region of the display screen and the current temperature includes: obtaining the compensated display data based on the display data of the target region of the display screen and the current temperature through a lookup table.

In a third aspect, an electronic device is provided, including: a display screen; an ambient light sensor provided below the display screen for sensing a light intensity of incident light, where the incident light includes ambient light passed through the display screen and light leaked from the display screen; and a processor. The processor is configured to: obtain an estimated light intensity of the light leaked from the display screen based on display data of a target region of the display screen; compute based on the estimated light intensity and a temperature compensation coefficient corresponding to a current temperature of the display screen, to obtain a light intensity of the light leaked from the display screen; and obtain a light intensity of the ambient light passed through the display screen based on the light intensity of the incident light and the light intensity of the light leaked from the display screen.

In another implementation of the present disclosure, the display screen is a LED display screen.

In another implementation of the present disclosure, the computing based on the estimated light intensity and the temperature compensation coefficient corresponding to the current temperature of the display screen includes: multiplying the estimated light intensity by the temperature compensation coefficient.

In another implementation of the present disclosure, the display data of the target region of the display screen includes: a gray scale value of a display pixel of the target region.

In another implementation of the present disclosure, the display pixel of the target region of the display screen includes: a red sub-pixel, a green sub-pixel, and a blue sub-pixel; the display data of the target region of the display screen includes: a gray scale value of the red sub-pixel, a gray scale value of the green sub-pixel, and a gray scale value of the blue sub-pixel; and the temperature compensation coefficients include: a temperature compensation coefficient of the red sub-pixel, a temperature compensation coefficient of the green sub-pixel, and a temperature compensation coefficient of the blue sub-pixel.

In another implementation of the present disclosure, the temperature compensation coefficient of the red sub-pixel, the temperature compensation coefficient of the green sub-pixel, and the temperature compensation coefficient of the blue sub-pixel are stored in a lookup table.

In another implementation of the present disclosure, all gray scale values of the red sub-pixel correspond to a same lookup table of the temperature compensation coefficients.

In another implementation of the present disclosure, different gray scale values of the red sub-pixel correspond to different lookup tables of the temperature compensation coefficients.

In another implementation of the present disclosure, a group of gray scale values of the red sub-pixel correspond to a same lookup table of the temperature compensation coefficients.

In another implementation of the present disclosure, the obtaining the temperature compensation coefficients includes: obtaining luminous intensities of the display screen at a plurality of preset temperatures, where the display screen is in a state free from influence of the ambient light; and determining temperature compensation coefficients corresponding to the preset temperatures with one of the plurality of preset temperatures as a reference and based on the luminous intensities of the display screen at the preset temperatures.

In a fourth aspect, an electronic device is provided, including: a display screen; an ambient light sensor provided below the display screen for sensing a light intensity of incident light, where the incident light includes ambient light passed through the display screen and light leaked from the display screen; and a processor. The processor is configured to: obtain compensated display data based on display data of the target region of the display screen and a current temperature; compute based on the compensated display data, to obtain a light intensity of the light leaked from the display screen; and obtain a light intensity of the ambient light passed through the display screen based on the light intensity of the incident light and the light intensity of the light leaked from the display screen.

In another implementation of the present disclosure, the display pixel of the target region of the display screen includes: a red sub-pixel, a green sub-pixel, and a blue sub-pixel; and the display data of the target region of the display screen includes: a gray scale value of the red sub-pixel, a gray scale value of the green sub-pixel, and a gray scale value of the blue sub-pixel.

In another implementation of the present disclosure, the obtaining the compensated display data based on the display data of the target region of the display screen and the current temperature includes: obtaining the compensated display data based on the display data of the target region of the display screen and the current temperature through a lookup table.

In the solutions of the embodiments of the present disclosure, the light leaked from the target region of the display screen is computed based on the display data of the target region of the display screen and the temperature compensation coefficient corresponding to the current temperature, and the light intensity of the ambient light incident on the ambient light sensor is obtained based on the light intensity of the incident light incident on the ambient light sensor and the computed light leaked from the target region of the display screen. By temperature compensation, the computed light leaked from the target region of the display screen is more accurate, thereby reducing the influence of temperature on the prediction of the light leaked from the display screen, and improving the accuracy of ambient light measurement of the ambient light sensor below the screen.

BRIEF DESCRIPTION OF THE DRAWINGS

Some specific embodiments of embodiments of the present disclosure will be described in detail below with reference to the accompanying drawings in an exemplary manner, instead of a limiting manner. Identical reference numerals in the drawings represent identical or similar components or parts. Those skilled in the art should understand that these drawings may not be drawn to scale.

DETAILED DESCRIPTION OF EMBODIMENTS

To make the objectives, technical solutions, and advantages of embodiments of the present disclosure clearer, the technical solutions in the embodiments of the present disclosure will be clearly and completely described below with reference to the accompanying drawings in the embodiments of the present disclosure. The embodiments described below are a part, instead of all, of the embodiments of the present disclosure. All other embodiments obtained by those of ordinary skills in the art based on the embodiments below without making creative work are encompassed within the scope of protection of the present disclosure.

The present disclosure provides a method for detecting an intensity of ambient light and an electronic device. The electronic device may be a mobile terminal device, such as a mobile phone and a tablet, or may be, e.g., a public electronic device, such as a ticket machine. The electronic device is, e.g., a mobile terminal device below.

Figure 1:
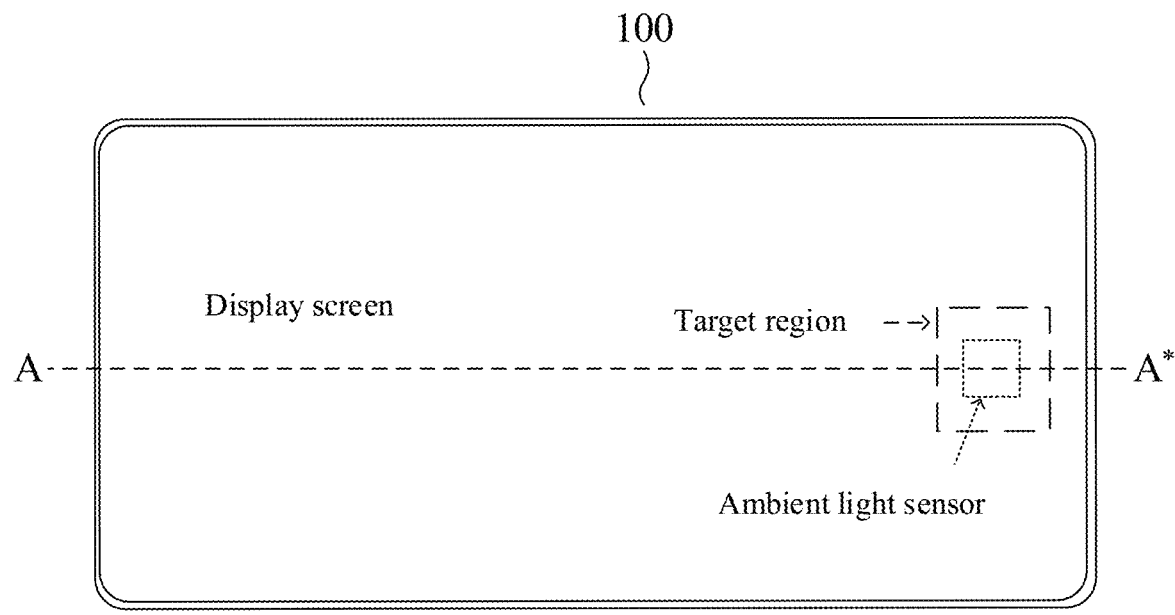
FIG. 1 is a schematic plane view of an electronic device including an ambient light sensor provided in an embodiment of the present disclosure.
Figure 2:
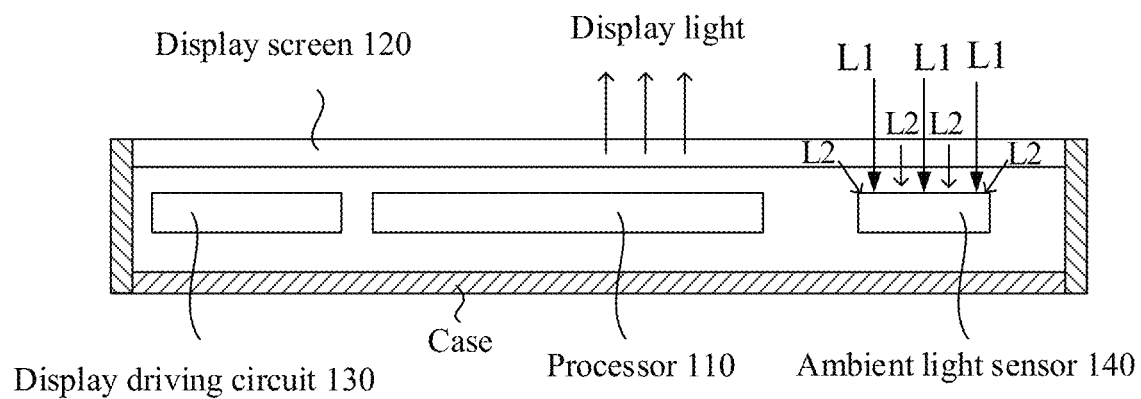
FIG. 2 is a sectional view of the electronic device provided in an embodiment of the present disclosure.
Figure 3:
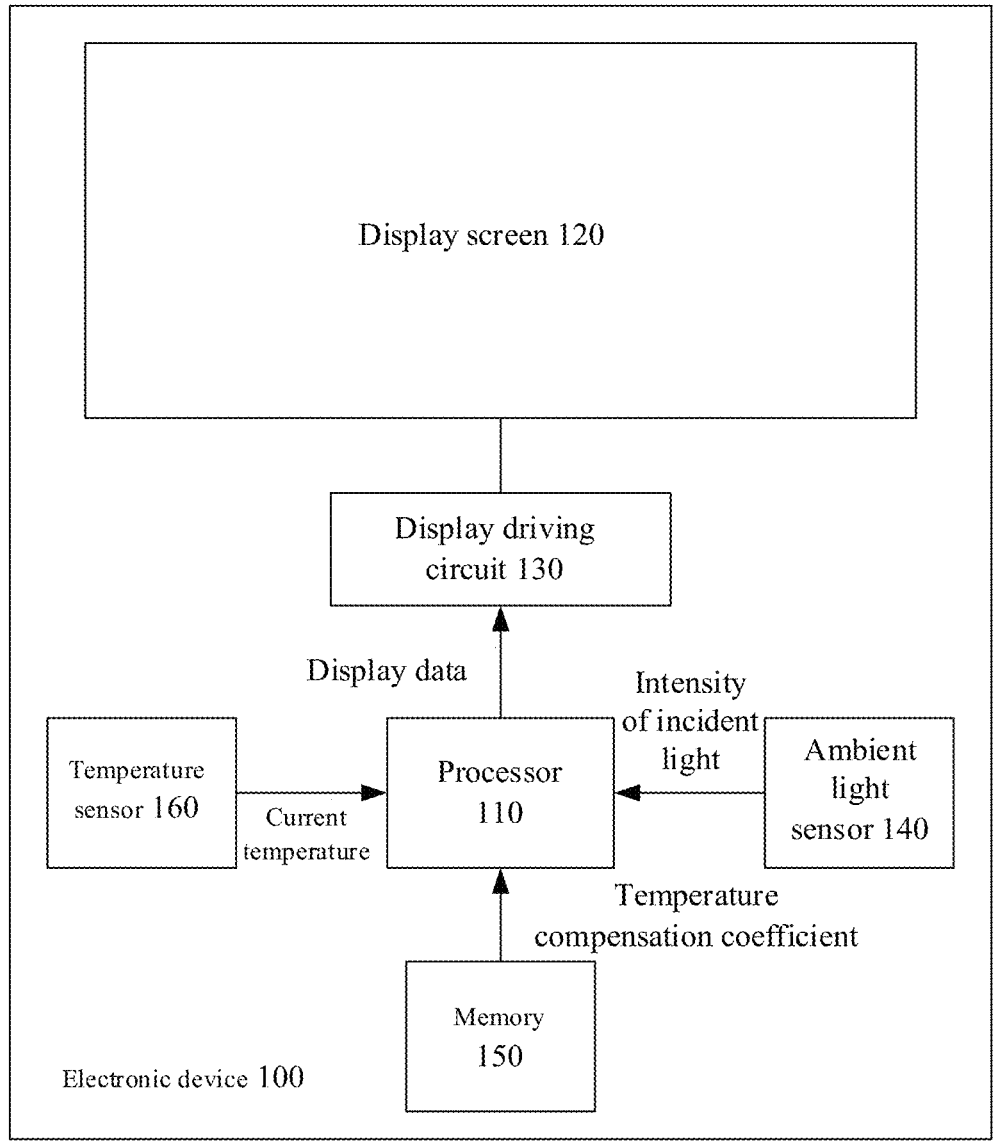
FIG. 3 is a structural block diagram of the electronic device provided in an embodiment of the present disclosure.

FIG. 1 is a schematic plane view of an electronic device provided in an embodiment of the present disclosure. FIG. 1 shows a section line A-A*. FIG. 2 is a sectional view of the electronic device sectioned along the section line A-A* in FIG. 1. FIG. 3 is a structural block diagram of the electronic device. The electronic device 100 includes a case, a processor 110, a display screen 120, a display driving circuit 130, a memory 150, a temperature sensor 160, and an ambient light sensor 140. The processor 110 is, for example, an ARM architecture or an X86 architecture. The processor 110 may include one or more processing units, e.g., an application processing unit, a modulating/demodulating unit, a graphics processing unit, an image signal processing unit, a video encoding/decoding unit, and a baseband processing unit. Different processing units may be stand-alone chips, or may be integrated into one or more chips. The memory 150 is configured to store an operating system and a program running on the processor, as well as various kinds of data in a running process. The processor 110, the display driving circuit 130, the memory 150, the ambient light sensor 140, and the temperature sensor 160 may be individually encapsulated chips, and may be arranged on a main board of the electronic device 100. In some embodiments, the ambient light sensor 140 and the temperature sensor 160 may be encapsulated together.

The display screen 120 is, for example, an organic light-emitting diode (OLED) display screen. In some embodiments, the display screen 120 further includes a touch layer for man-machine interaction. The display screen 120 includes a display pixel array, which includes a plurality of display pixels addressed by a data line and a scan line. Each display pixel includes a red sub-pixel, a green sub-pixel, and a blue sub-pixel. Each red sub-pixel includes a red LED, each green sub-pixel includes a green LED, and each blue sub-pixel includes a blue LED. Display light generated by each display pixel is a hybrid composed of red light generated by the red LED, green light generated by the green LED, and blue light generated by the blue LED. In some embodiments, the display pixels of the display screen 120 further include a white sub-pixel.

The processor 110 transmits display data of a display image to the display driving circuit 130. The display driving circuit 130 drives the display screen 120 to generate display light based on the display data. For an OLED display screen, the display driving circuit 130 determines a driving current or a driving voltage of each sub-pixel based on the display data. A luminous intensity of the LED depends on the driving current or the driving voltage. The display image is usually divided into a plurality of image pixels, and the image pixels of the display image correspond to the display pixels of the display screen. The display data provided by the processor 110 to the display driving circuit 130 may be gray scale values and reference brightness of the display pixels of the display screen. The display driving circuit 130 may realize a color of a corresponding image pixel based on the gray scale values of the display pixels. For example, the display data includes a gray scale value of the red sub-pixel, a gray scale value of the green sub-pixel, and a gray scale value of the blue sub-pixel of each display pixel of the display screen. The gray scale value is, for example, an 8-bit binary number, and therefore has 256 values (from 0 to 255). Different gray scale values correspond to different luminous intensities of the LED. Therefore, the red sub-pixel of the display screen can generate 256 levels of red light, and has brightness of Bright*(gray scale value/255)$^r$, where r depends on an employed gamma curve. Similarly, brightness of the green sub-pixel and brightness of the blue sub-pixel may be determined based on the gray scale values thereof. When the display pixels of the display screen further include the white sub-pixel, the display data further includes a gray scale value of the white sub-pixel. The display driving circuit provides, based on a gray scale value of each sub-pixel, a corresponding driving current or driving voltage to the sub-pixel. The temperature sensor 160 is used for sensing. As shown in FIG. 2, the ambient light sensor 140 is provided below the display screen 120. The ambient light sensor 140 is configured to sense a light intensity of incident light. The processor 110 obtains a light intensity of ambient light based on the light intensity of the incident light sensed by the ambient light sensor 140, e.g., a light intensity of ambient light in an environment in which the electronic device 100 is located. The processor 110 adjusts display brightness of the display screen 120 based on the light intensity of the ambient light.

It is understandable that the structure illustrated in the embodiment of the present disclosure does not constitute a specific limitation to the electronic device 100. In some other embodiments of the present disclosure, the electronic device 100 may include more or fewer components than the components shown in the figure, or combine some components, or split some components, or have different components, or have different component arrangements. For example, the electronic device 100 further includes a battery, a microphone, and the like.

A side of the display screen 120 facing a user is the front of the display screen 120, and a side opposite to the front is the back of the display screen 120. A portion of light generated by the display screen 120 is emitted from the front to form display light, which is received by human eyes. A portion of the light generated by the display screen 120 will leak from the back. The ambient light sensor 140 includes a photosensitive pixel array. The photosensitive pixel includes, for example, a photodiode or a photoresistor. The photosensitive pixel can convert light incident on the photosensitive pixel into an electrical signal (e.g., a voltage or current). The greater the light intensity of the incident light is, the greater the electrical signal is. This electrical signal characterizes the light intensity of the incident light. The photosensitive pixel array is also referred to as a photosensitive region of the ambient light sensor 140, and light incident on the photosensitive region of the ambient light sensor 140 is referred to as the incident light. When the ambient light sensor 140 senses the ambient light, the display screen is usually in a display state (also known as a lightened state), such that the ambient light sensor 140 will also sense light leaked from the back of the display screen 120. As shown in FIG. 2, the ambient light sensor 140 not only receives the ambient light L1 passed through the display screen 120, but also will receive the light L2 leaked from the back of the display screen 120. The incident light of the ambient light sensor 140 includes the ambient light L1 passed through the display screen 120 and the light L2 leaked from the display screen 120. The ambient light sensor 140 may be connected to the processor 110 through an I2C interface or SPI interface, and the processor 110 computes the intensity of the ambient light based on the intensity of the incident light sensed by the ambient light sensor 140. A light intensity of the light L2 leaked from the display screen 120 varies with contents of a display image, and the light L2 leaked from the back of the display screen 120 affects the accuracy of light intensity detection of the ambient light. For example, the light intensity of the light leaked from the display screen 120 is generally from 0 to 10 lux (lux is an illumination unit for characterizing illuminance). The transmissivity of an OLED display screen 120 is generally 1-8%, e.g., 3%, which means that only 0.3 lux of intensity remains after 10 lux ambient light passes through the OLED display screen 120. The intensity of the 0.3 lux ambient light is obviously insufficient, compared with the intensity of the light (from 0 to 10 lux) leaked from the display screen. Therefore, the light leaked from the back of the display screen results in the light intensity detection error of the ambient light, or even the intensity of the ambient light cannot be detected at all. In order to obtain the accurate light intensity of the ambient light, it is necessary to subtract the light intensity of the light leaked from the back of the display screen 120 from the light intensity sensed by the ambient light sensor 140.

Figure 4:
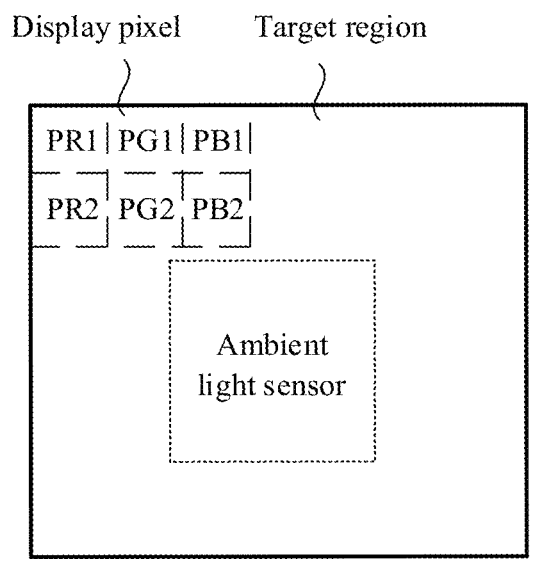
FIG. 4 is a schematic diagram of a target region of a display screen corresponding to the ambient light sensor provided in an embodiment of the present disclosure.

The ambient light sensor 140 has a certain light sensing angle. Therefore, not all light leaked from the back of the whole display screen 120 will interfere with the ambient light detection. The display screen 120 has a region corresponding to the ambient light sensor 140. When the light leaked from the back of the display screen 120 is computed, it is necessary to consider the light leaked from the back of this region. Herein, the region of the display screen 120 corresponding to the ambient light sensor 140 is referred to as a target region. When the light intensity of the ambient light is computed, it is necessary to consider the interference of light leak generated in the target region in the ambient light detection process. The position and area of the target region depend on the installation site of the ambient light sensor 140. FIG. 4 is a schematic diagram of a target region of the display screen 120 corresponding to the ambient light sensor 140 provided in an embodiment of the present disclosure. The target region includes a plurality of display pixels in a pixel array of the display screen 120. FIG. 4 shows 2 display pixels in the target region: a display pixel consisting of a red sub-pixel PR1, a green sub-pixel PG1, and a blue sub-pixel PB1, and a display pixel consisting of a red sub-pixel PR2, a green sub-pixel PG2, and a blue sub-pixel PB2.

As shown in FIG. 3, the processor 110 transmits display data of the whole display screen 120 to the display driving circuit 130, where the display data includes gray scale values of the display pixels. The processor 110 computes the light intensity of the light L2 leaked from the back of the target region of the display screen 120 based on display data of the target region of the display screen 120. In some embodiments, the processor 110 computes a luminous intensity of the target region of the display screen 120 based on the display data of the target region of the display screen 120, and computes the light intensity of the light leaked from the target region of the display screen 120 based on the luminous intensity of the target region of the display screen 120. However, the luminous intensity of the display screen 120 will be affected by temperature. Generally, at a given gray scale value, the higher the temperature is, the greater the luminous intensity of the display screen 120 is. Therefore, when the processor 110 obtains the light intensity of the ambient light based on detection data of the ambient light sensor 140, it is necessary to consider the influence of temperature.

In some embodiments, the processor 110 is configured to obtain an estimated light intensity of the light leaked from the target region of the display screen 120 based on the display data of the target region of the display screen 120; compute based on the estimated light intensity and a temperature compensation coefficient corresponding to a current temperature of the display screen 120, to obtain the light intensity of the light leaked from the display screen 120; and obtain the light intensity of the ambient light passed through the display screen 120 based on the light intensity of the incident light and the light intensity of the light leaked from the target region of the display screen 120. In some embodiments, the processor 110 is configured to obtain compensated display data based on the display data of the target region of the display screen 120 and the current temperature; compute based on the compensated display data, to obtain the light intensity of the light leaked from the target region of the display screen 120; and obtain the light intensity of the ambient light passed through the display screen 120 based on the light intensity of the incident light and the light intensity of the light leaked from the target region of the display screen 120. A temperature compensation step is added in the process of computing the light intensity of the light L2 leaked from the back of the display screen, such that the computed light intensity of the leaked light L2 is more accurate. The process of obtaining the light intensity of the ambient light based on the light intensity of the incident light, the display data of the target region, and the current temperature will be described below with reference to a plurality of embodiments.

Figure 6:
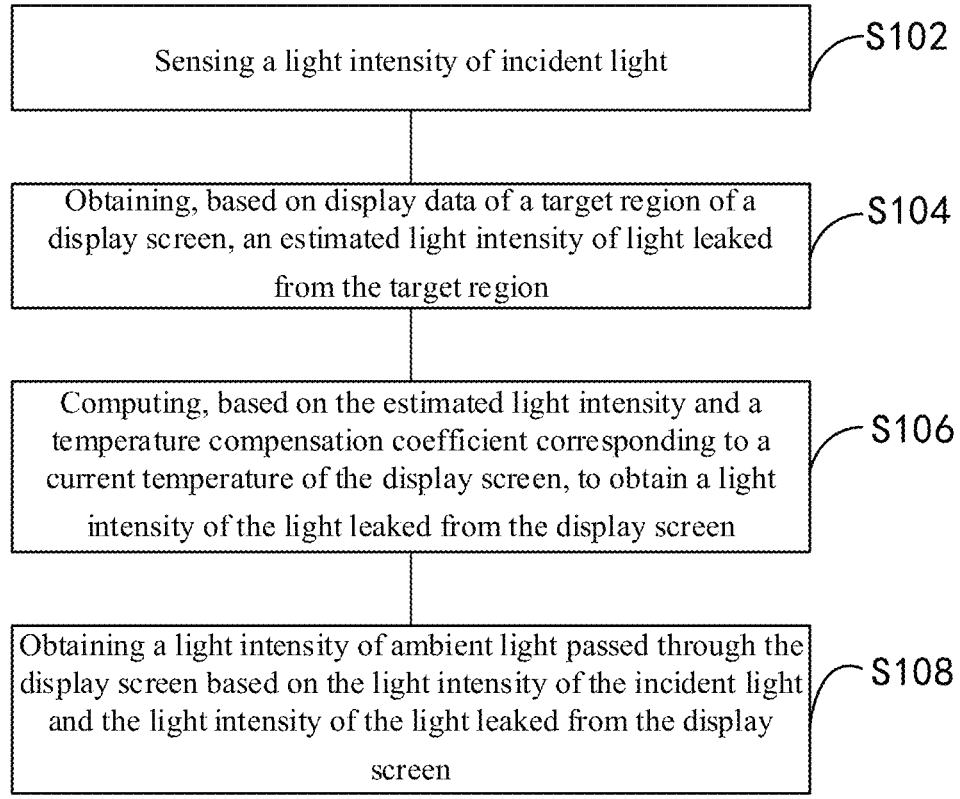
FIG. 6 is a flowchart of a method for detecting an intensity of ambient light in the present disclosure.

FIG. 6 is a method for detecting an intensity of ambient light provided in an embodiment of the present disclosure.

The method for detecting an intensity of ambient light is executed by a processor 110 and an ambient light sensor 140. The method for detecting an intensity of ambient light includes the following steps.

Step S102: sensing, by an ambient light sensor 140, a light intensity of incident light. The incident light is light incident on the ambient light sensor 140, and includes the ambient light passed through the display screen 120 and light leaked from the back of the display screen 120.

Step S104: obtaining, by a processor 110, based on display data of a target region of a display screen, an estimated light intensity of light leaked from the target region. The display data of the target region is a part of display data transmitted by the processor 110 to a display driving circuit 130. The display data of the target region of the display screen 120 includes a gray scale value of a display pixel of the target region. The display pixel of the target region of the display screen 120 includes a red sub-pixel, a green sub-pixel, and a blue sub-pixel; and the gray scale value of the display pixel includes a gray scale value of the red sub-pixel, a gray scale value of the green sub-pixel, and a gray scale value of the blue sub-pixel. In some embodiments, the display pixel further includes a white sub-pixel, and the gray scale value of the display pixel further includes a gray scale value of the white sub-pixel.

In some embodiments, the memory 150 stores an estimated light intensity value corresponding to the display data of the target region, e.g., in the form of a lookup table, and the processor 110 obtains the estimated light intensity of the light leaked from the target region by accessing the memory 150.

In some embodiments, the processor 110 computes a luminous intensity of the red sub-pixel, a luminous intensity of the green sub-pixel, and a luminous intensity of the blue sub-pixel based on the gray scale value of the red sub-pixel, the gray scale value of the green sub-pixel, and the gray scale value of the blue sub-pixel of each display pixel in the target region of the display screen 120, and further computes an estimated light intensity of light of the red sub-pixel leaked from the back, an estimated light intensity of light of the green sub-pixel leaked from the back, and an estimated light intensity of light of the blue sub-pixel leaked from the back. There is a certain relationship between the luminous intensity of the display pixel and the light intensity of the light leaked from the back. For example, at a predetermined temperature (e.g., 25° C.), a relationship model between the luminous intensity of the display pixel and the light leaked from the back is obtained by experimental measurement. The estimated light intensity of the light leaked from the back is computed based on the relationship model and the computed luminous intensities of the sub-pixels. The relationship model between the luminous intensity of the display pixel and the light leaked from the back may be stored in the memory 150 for use by the processor 110. In some embodiments, the relationship model between the luminous intensity of the display pixel and the light leaked from the back includes a relationship model between the luminous intensity of the red sub-pixel and the light leaked from the back, a relationship model between the luminous intensity of the green sub-pixel and the light leaked from the back, and a relationship model between the luminous intensity of the blue sub-pixel and the light leaked from the back. Example methods for computing an estimated light intensity include Chinese patent application for invention with the application number 202011401915.5 and Chinese patent application for invention with the application number 202011428899.9. Of course, the method for computing an estimated light intensity of light L2 leaked from the back of the display screen 120 in the present disclosure is not limited to the example methods.

Step S106: computing, by the processor 110, based on the estimated light intensity and a temperature compensation coefficient corresponding to a current temperature of the display screen 120, to obtain a light intensity of light L2 leaked from the display screen.

The processor 110 obtains the current temperature from a temperature sensor 160. In order to eliminate or reduce the influence of temperature on the computed light intensity of the light L2 leaked from the target region, the memory 150 further stores a temperature compensation coefficient. The temperature compensation coefficient is stored in the memory 150, e.g., in the form of a lookup table. The lookup table is, for example, the lookup table shown in Table 1. Based on the light intensity of the light L2 leaked from the back at a reference temperature T0 (e.g., 25° C.), the temperature compensation coefficient at the reference temperature is 1. Light intensities of the light L2 leaked from the back at other temperatures are obtained by multiplying the estimated light intensity by corresponding temperature compensation coefficients. The reference temperature is, for example, a temperature at which a relationship between the luminous intensity of the display pixel and the light leaked from the back is determined. For example, the current temperature sensed by the temperature sensor 160 is T1, and the processor 110 obtains a temperature compensation coefficient KR1 of the red sub-pixel, a temperature compensation coefficient KG1 of the green sub-pixel and a temperature compensation coefficient KB1 of the blue sub-pixel corresponding to the current temperature T1 from the memory 150. The processor 110 computes a light intensity L2R of red light, a light intensity L2G of green light, and a light intensity L2B of blue light of the light L2 leaked from the back in accordance with the following equations:

$L2R = LestR*KR1$ $L2G = LestG*KG1$ $L2B = LestB*KB1$

LestR, LestG, and LestB are an estimated light intensity of the red light, an estimated light intensity of the green light, and an estimated light intensity of the blue light, respectively. The light intensity of the light L2 leaked from the target region may be obtained based on the light intensity L2R of the red light, the light intensity L2G of the green light, and the light intensity L2B of the blue light intensity.

TABLE 1

| Temperature (° C.) | Temperature compensation coefficient KR of red sub-pixel | Temperature compensation coefficient KG of green sub-pixel | Temperature compensation coefficient KB of blue sub-pixel |
|---|---|---|---|
| T0 | 1 | 1 | 1 |
| T1 | KR1 | KG1 | KB1 |
| T2 | KR2 | KG2 | KB2 |
| ... | ... | ... | ... |
| Tn | KRn | KGn | KBn |

Step S108: obtaining, by the processor 110, a light intensity of ambient light L1 passed through the display screen 120 based on the light intensity of the incident light and the light intensity of the light L2 leaked from the display screen 120.

For example, the light intensity of the ambient light L1 is the light intensity of the incident light minus the computed light intensity of the light L2 leaked from the display screen. Since the ambient light sensor 140 is provided below the display screen 120, the ambient light sensed by the ambient light sensor 140 is the portion that passed through the display screen 120. In some embodiments, the processor 110 is further configured to divide the light intensity of the ambient light L1 obtained in step S106 by a light transmittance of the display screen 120 to obtain a light intensity of ambient light in an environment in which the electronic device 100 is located.

Steps S104 and S106 are illustrated with reference to two examples. In one example, the processor 110 obtains an estimated light intensity of red light leaked from the target region, an estimated light intensity of green light leaded from the target region, and an estimated light intensity of blue light leaked from the target region at the reference temperature T0 by accessing the memory 150 based on the gray scale value of the red sub-pixel, the gray scale value of the green sub-pixel, and the gray scale value of the blue sub-pixel in the target region of the display screen. The processor 110 obtains the corresponding temperature compensation coefficients KR1, KG1, and KB1 based on the current temperature T1, and computes the light intensity of the light L2 leaked from the display screen based on the estimated light intensities and the temperature compensation coefficients.

In another example, the processor 110 computes a light intensity LR of red light generated by the red sub-pixel of the display pixel, a light intensity LG of green light of the green sub-pixel of the display pixel, and a light intensity LB of blue light of the blue sub-pixel of the display pixel based on the gray scale value of the red sub-pixel, the gray scale value of the green sub-pixel, and the gray scale value of the blue sub-pixel in the target region of the display screen. The memory 150 stores a relationship model between the luminous intensity of the display pixel and the light leaked from the back at an ambient temperature T0. The processor 110 further computes an estimated light intensity LeakR of leaked light of the red sub-pixel, an estimated light intensity LeakG of leaked light of the green sub-pixel, and an estimated light intensity LeakB of leaked light of the blue sub-pixel at a reference ambient temperature T0. Based on the estimated light intensity of leaked light of the red sub-pixel of each display pixel, the estimated light intensity of leaked light of the green sub-pixel of each display pixel, and the estimated light intensity of leaked light of the blue sub-pixel of each display pixel, the processor 110 may compute the estimated light intensity of red leaked light, the estimated light intensity of green leaked light, and the estimated light intensity of blue leaked light in the target region. The processor 110 determines the corresponding temperature compensation coefficients based on the current temperature. For example, the current ambient temperature is T1, and the corresponding temperature compensation coefficients are KR1, KG1, and KB1. The processor 110 computes the light intensity of the light L2 leaked from the display screen based on the estimated light intensities and the temperature compensation coefficients. For example, the estimated light intensity of the light L2 leaked from the display screen multiplied by the temperature compensation coefficient is the light intensity of the light L2 leaked from the display screen.

In the present embodiment, temperature compensation is added in the process of computing the light intensity of the light leaked from the target region of the display screen, thereby reducing the influence of temperature on the computing of the light leaked from the display screen, and improving the accuracy of the ambient light sensing apparatus below the screen.

Figure 7:
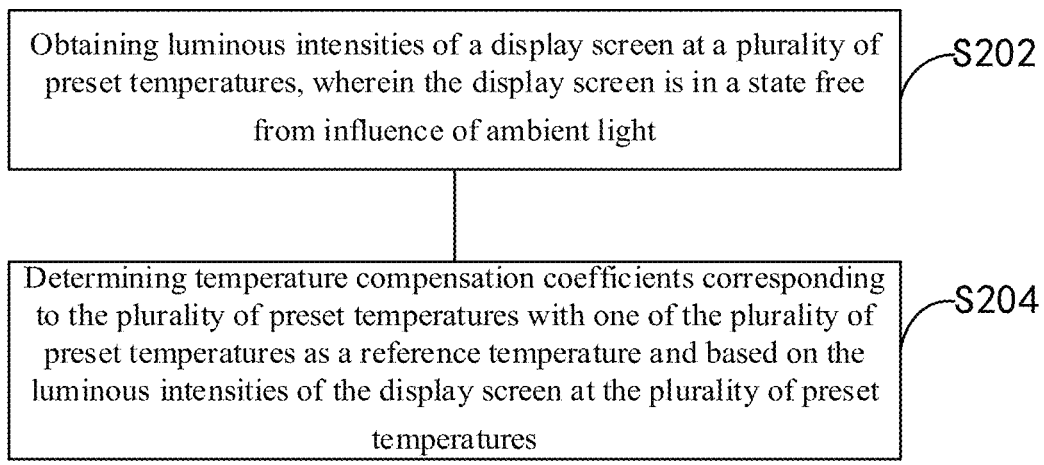
FIG. 7 is a flowchart of a method for determining a temperature compensation coefficient in the present disclosure.

FIG. 7 is a flowchart of a method for obtaining a temperature compensation coefficient provided in an embodiment of the present disclosure. The method for obtaining a temperature compensation coefficient includes the following steps.

Step S202: obtaining luminous intensities of a display screen at a plurality of preset temperatures, where the display screen is in a state free from influence of ambient light. In some embodiments, the display screen is placed in a test thermostat. For example, an electronic device including a display screen is placed in the test thermostat. The test thermostat may provide a plurality of test temperatures. In order to eliminate the influence of the ambient light, the display screen is isolated from the ambient light using a black mask.

In some embodiments, a test box is made to traverse the plurality of preset temperatures, and a luminous intensity of the display screen at each preset temperature is recorded. The plurality of preset temperatures is, for example, from −10° C. to 40° C. with a step size of, for example, 1° C.

In order to obtain a temperature compensation coefficient of a red sub-pixel, a temperature compensation coefficient of a green sub-pixel, and a temperature compensation coefficient of a blue sub-pixel, the display screen is successively set at 3 gray scale values at each preset temperature, and a relationship curve between temperature and luminous intensity of the display screen is obtained at each gray scale value setting. For example, a first gray scale value setting of the display screen is that a gray scale value of all red sub-pixels of the display screen is set as 255, and a gray scale value of all green sub-pixels and blue sub-pixels of the display screen is set as 0, i.e., only the red sub-pixels of the display screen are lightened; a second gray scale value setting is that a gray scale value of all green sub-pixels of the display screen is set as 255, and a gray scale value of all red sub-pixels and blue sub-pixels of the display screen is set as 0, i.e., only the green sub-pixels of the display screen are lightened; and a third gray scale value setting is that a gray scale value of all blue sub-pixels of the display screen is set as 255, and a gray scale value of all red sub-pixels and green sub-pixels of the display screen is set as 0, i.e., only the blue sub-pixels of the display screen are lightened. It is understandable that 255 is only an example. By the first gray scale value setting, a relationship curve between the luminous intensity of the red sub-pixel of the display screen and the temperature can be obtained; by the second gray scale value setting, a relationship curve between the luminous intensity of the green sub-pixel of the display screen and the temperature can be obtained; and by the third gray scale value setting, the relationship curve between the luminous intensity of the blue sub-pixel of the display screen and the temperature can be obtained. In some embodiments, the reference brightness of the display screen is also set to a maximum value at the 3 gray scale settings.

Figure 8A:
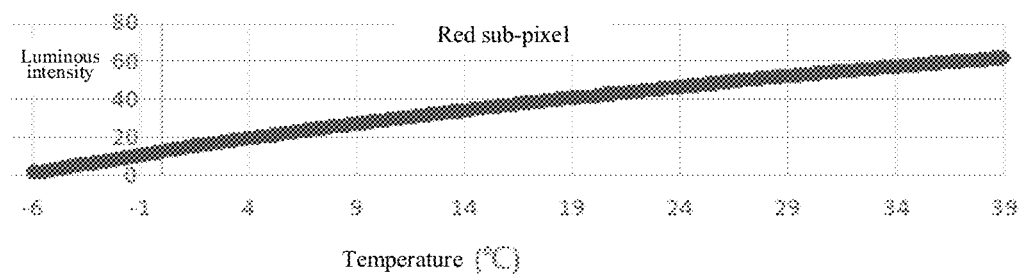
FIG. 8A-FIG. 8C are a relationship curve between luminous intensity of a red sub-pixel of the display screen and temperature, a relationship curve between luminous intensity of a green sub-pixel of the display screen and temperature, and a relationship curve between luminous intensity of a blue sub-pixel of the display screen and temperature provided in an embodiment of the present disclosure, respectively.
Figure 8B:
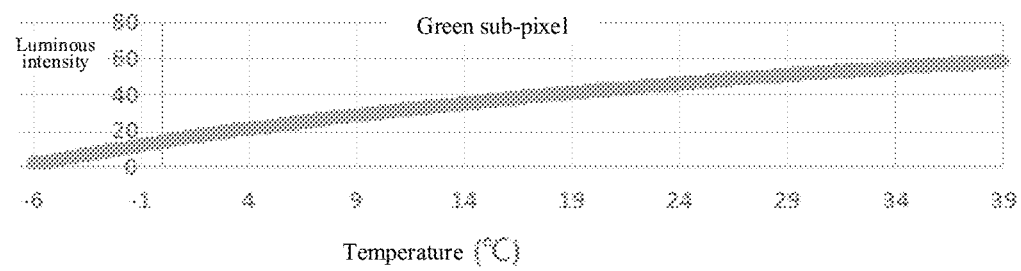
Figure 8C:
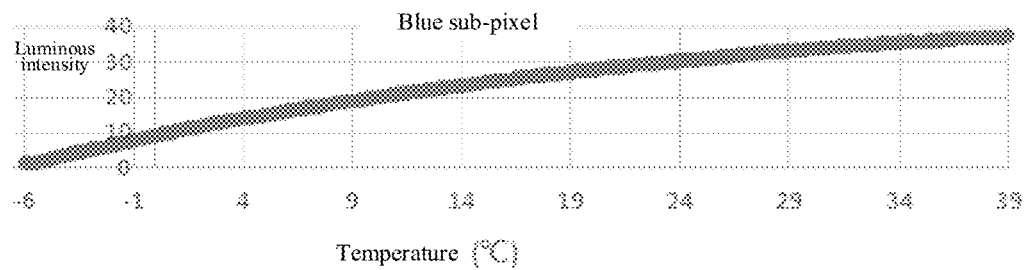

FIG. 8A-FIG. 8C are a measured relationship curve between luminous intensity of a red sub-pixel of the display screen and temperature, a measured relationship curve between luminous intensity of a green sub-pixel of the display screen and temperature, and a measured relationship curve between luminous intensity of a blue sub-pixel of the display screen and temperature, respectively. As shown in FIG. 8A-FIG. 8C, the luminous intensity of the display screen varies with the temperature.

Step S204: determining temperature compensation coefficients corresponding to the plurality of preset temperatures with one of the plurality of preset temperatures as a reference temperature and based on the luminous intensities of the display screen at the plurality of preset temperatures. Taking the red sub-pixel as an example, with T0 (e.g., 25° C.) as the reference temperature, the temperature compensation coefficient of the red sub-pixel at T0 is 1. For another preset temperature, a ratio of the luminous intensity of the red sub-pixel of the display screen at the preset temperature to the luminous intensity of the red sub-pixel of the display screen at T0 is the temperature compensation coefficient at the preset temperature. For example, the temperature compensation coefficient KR=Lux(T)/Lux(T0), where Lux (T0) is a light intensity measured at the reference temperature T0, and Lux (T) is a light intensity measured at a preset temperature other than the reference temperature. Similarly, the temperature compensation coefficient of the green sub-pixel and that of the blue sub-pixel may be obtained.

Further, the temperature compensation coefficient corresponding to each preset temperature is stored in the memory 150. The temperature compensation coefficients are stored, for example, in the form of a lookup table in Table 1.

Figure 9:
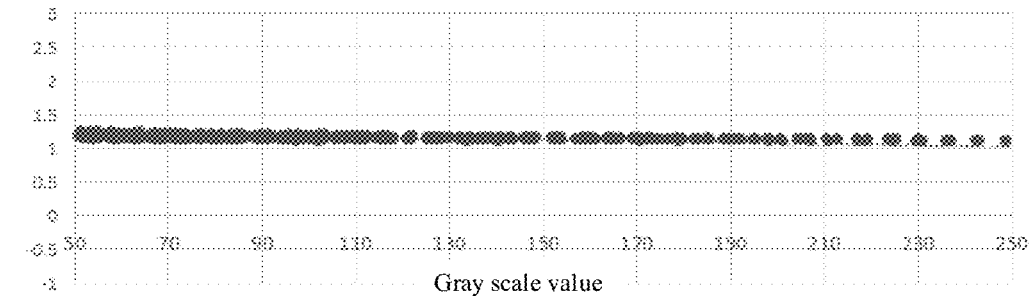
FIG. 9 is a relationship curve between a gray scale value and a ratio between luminous intensities of the display screen at two temperatures provided in an embodiment of the present disclosure.

In some embodiments, for one or more of the red sub-pixel, the green sub-pixel, and the blue sub-pixel, all gray scale values of the sub-pixels correspond to a same lookup table of temperatures and temperature compensation coefficients. In order to prove that the temperature compensation coefficient is adapted to temperature compensation at other gray scale values, the applicant conducted the following experiments. A luminous intensity Dn@T1 of the display screen at each gray scale value (from 0 to 255) of the sub-pixels of the display screen was obtained at a temperature T1, and a luminous intensity Dn@T2 of the display screen at each gray scale value of the sub-pixels of the display screen was obtained at a temperature T2. For each gray scale value, a ratio of the luminous intensity Dn@T1 at the temperature T1 to the luminous intensity Dn@T2 at the temperature T2 was computed. FIG. 9 shows a relationship curve between a gray scale value and a ratio between luminous intensities at two temperatures. As shown in FIG. 9, the ratio between the luminous intensities at the two temperatures changes little with the gray scale value, thereby proving that the temperature compensation coefficient obtained at a gray scale value may be adapted to other gray scale values. For example, when the gray scale value of the red sub-pixel of the display screen 120 is set as 255, the temperature compensation coefficients at the plurality of preset temperatures are obtained in accordance with the method shown in FIG. 7. FIG. 9 proves that the temperature compensation coefficients at the plurality of preset temperatures are adapted to other gray scale values of the red sub-pixel.

Figure 5:
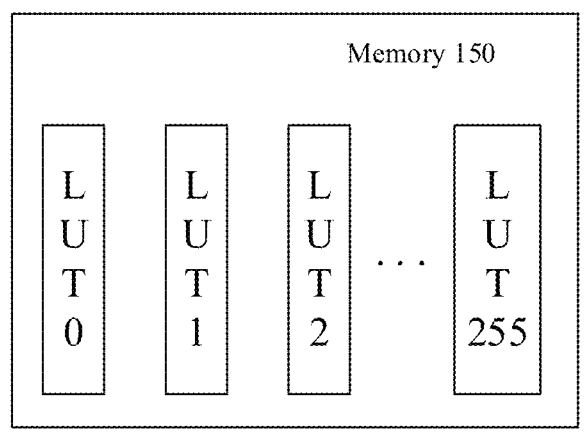
FIG. 5 shows a lookup table stored in a memory.

For some display screens 120, there is a high correlation between the temperature compensation coefficient and the gray scale value, i.e., the temperature compensation coefficients at different gray scale values are greatly different, so that it is necessary to provide a plurality of lookup tables as shown in Table 1. In some embodiments, for one or more of the red sub-pixel, the green sub-pixel, and the blue sub-pixel, different gray scale values of the sub-pixels correspond to different lookup tables of the temperature compensation coefficients. For example, 256 gray scale values are available for the red sub-pixel. As shown in FIG. 5, 256 lookup tables are provided for the red sub-pixel, and each gray scale value corresponds to a lookup table of the temperature compensation coefficients (a lookup table of the temperature compensation coefficients with a gray scale value of 0 may be omitted, i.e., temperature compensation is not performed when the gray scale value is 0). Such a setting obtains a more accurate light intensity of the light leaked from the display screen, but needs to occupy more storage resources, and increases the computational complexity.

In some embodiments, for one or more of the red sub-pixel, the green sub-pixel, and the blue sub-pixel, a group of gray scale values of the sub-pixels correspond to a same lookup table of the temperature compensation coefficients. For example, 256 gray scale values are available for the red sub-pixel, a group of gray scale values among the 256 gray scale values correspond to a lookup table of the temperature compensation coefficients, and another group of gray scale values among the 256 gray scale values correspond to another lookup table of the temperature compensation coefficients. Lookup tables are provided using this setting to give consideration to both storage resources and computational accuracy.

In order to validate the effects of the ambient light sensor with the above temperature compensation and the method for detecting an intensity of ambient light, the applicant conducted the following experiments. A mobile phone with an ambient light sensor was placed in a test thermostat, and the display screen of the mobile phone was isolated from the ambient light with a black mask, so that the display screen of the mobile phone was in a state free from ambient light interference. The test thermostat was successively stabilized at −10° C. to obtain luminous intensities of the display screen at different gray scale values. The test thermostat was successively stabilized at 10° C. to obtain luminous intensities of the display screen at different gray scale values. In accordance with the solution without temperature compensation, the estimated luminous intensity of the display screen was computed based on the gray scale value of the display screen. The estimated luminous intensity of the display screen was multiplied by the corresponding temperature coefficient to obtain the estimated luminous intensity with temperature compensation. At −10° C. and 10° C., the estimated luminous intensities with temperature compensation were closer to the actually measured luminous intensity of the display screen.

In an embodiment, temperature compensation may be performed on the display data of the target region, and then the light intensity of the light leaked from the display screen may be computed based on the display data after temperature compensation.

Figure 10:
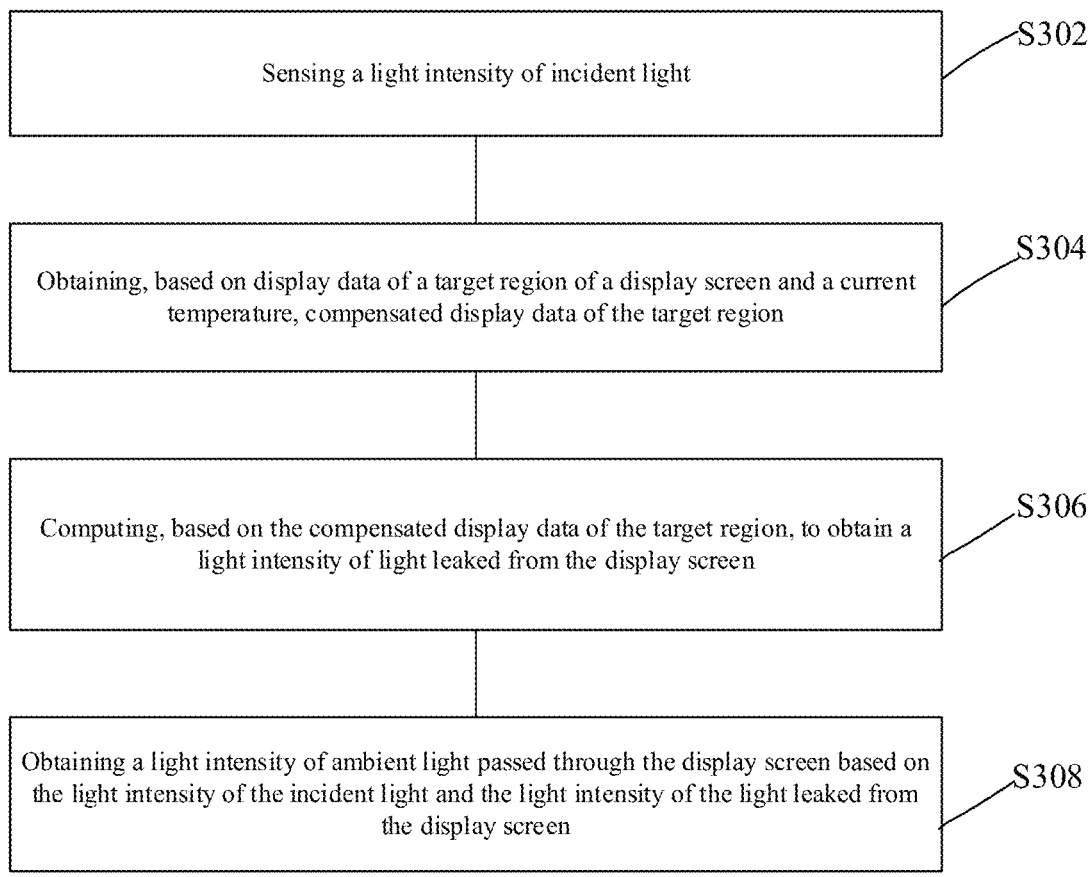
FIG. 10 is a flowchart of another method for detecting an intensity of ambient light in the present disclosure.

FIG. 10 is a method for detecting an intensity of ambient light provided in another embodiment of the present disclosure. The method for detecting an intensity of ambient light is executed by an ambient light sensor and a processor. The method for detecting an intensity of ambient light includes the following steps.

Step S302: sensing, by an ambient light sensor 140, a light intensity of incident light, where the incident light includes ambient light passed through the display screen 120 and light leaked from the back of the display screen 120.

Step S304: obtaining, by a processor 110, based on display data of a target region of a display screen 120 and a current temperature, compensated display data of the target region. The display data of the target region of the display screen obtained from the processor 110 includes a gray scale value GSR1 of a red sub-pixel, a gray scale value GSG1 of a green sub-pixel, and a gray scale value GSB1 of a blue sub-pixel of each display pixel in the target region of the display screen. When the current ambient temperature is T1, the processor 110 determines the compensated display data based on the display data of the target region of the display screen and the temperature compensation coefficient corresponding to the current temperature. The compensated display data includes a compensated gray scale value GSR2 of the red sub-pixel, a compensated gray scale value GSG2 of the green sub-pixel, and a compensated gray scale value GSB2 of the blue sub-pixel of each display pixel of the target region. The compensated gray scale value of the red sub-pixel is GSR2=GSG1*KR1, the compensated gray scale value of the green sub-pixel is GSG2*KG1, and the compensated gray scale value of the blue sub-pixel is GSB2*KB1. The temperature compensation coefficient is stored in the memory 150, e.g., in the form of a lookup table.

Step S306: computing, by the processor 110, based on the compensated display data of the target region, to obtain a light intensity of light leaked from the display screen. Specifically, the processor 110 computes a luminous intensity of the red sub-pixel of each display pixel, a luminous intensity of the green sub-pixel of each display pixel, and a luminous intensity of the blue sub-pixel of each display pixel based on the compensated display data, and computes a light intensity of leaked light of the red sub-pixel, a light intensity of leaked light of the green sub-pixel, and a light intensity of leaked light of the blue sub-pixel based on the luminous intensity of the red sub-pixel, the luminous intensity of the green sub-pixel, and the luminous intensity of the blue sub-pixel, to further obtain a light intensity of red leaked light, a light intensity of green leaked light, and a light intensity of blue leaked light in the target region, thus obtaining a light intensity of light L2 leaked from the display screen.

Step S308: obtaining, by the processor 110, a light intensity of ambient light L1 passed through the display screen based on the light intensity of the incident light and the light intensity of the light L2 leaked from the display screen.

In the solutions of the embodiments of the present disclosure, the light leaked from the target region of the display screen is computed based on the display data of the target region of the display screen and the temperature compensation coefficient corresponding to the current temperature, and the light intensity of the ambient light is obtained based on a light intensity of incident light incident on a light intensity sensing unit and the computed light leaked from the target region of the display screen. By temperature compensation, the computed light leaked from the target region of the display screen is more accurate, thereby reducing the influence of temperature on the prediction of the light leaked from the display screen, and improving the accuracy of ambient light computation of the ambient light sensor below the screen.

The above description merely provides embodiments of the present disclosure, and is not intended to limit the present disclosure. For those skilled in the art, the present disclosure may have various modifications and alterations. Any modification, equivalent replacement, improvement, and the like made within the spirit and principle of the present disclosure should be encompassed within the scope of the appended claims of the present disclosure.

What is claimed is:

1. A method for detecting an intensity of ambient light applicable to an ambient light sensor, the ambient light sensor being provided below a display screen, the detection method comprising:
   sensing a light intensity of incident light, wherein the incident light comprises ambient light passed through the display screen and light leaked from the display screen;
   obtaining an estimated light intensity of the light leaked from the display screen based on display data of a target region of the display screen, wherein the target region is a region of the display screen corresponding to the ambient light sensor;
   computing an actual light intensity of the light leaked from the display screen based on the estimated light intensity and a temperature compensation coefficient corresponding to a current temperature of the display screen, wherein the temperature compensation coefficient is indicative of a degree of influence of the current temperature of the display screen on a luminous intensity of the display screen; and
   obtaining a light intensity of the ambient light passed through the display screen based on the actual light intensity of the incident light and the light intensity of the light leaked from the display screen.

2. The detection method according to claim 1, wherein the computing the actual light intensity of the light leaked from the display screen based on the estimated light intensity and the temperature compensation coefficient corresponding to the current temperature of the display screen comprises: multiplying the estimated light intensity by the temperature compensation coefficient to obtain the actual light intensity of the light leaked from the display screen.

3. The detection method according to claim 1, wherein the display data of the target region of the display screen comprises: a gray scale value of a display pixel of the target region.

4. The detection method according to claim 3, wherein the display pixel of the target region of the display screen comprises: a red sub-pixel, a green sub-pixel, and a blue sub-pixel; the display data of the target region of the display screen comprises: a gray scale value of the red sub-pixel, a gray scale value of the green sub-pixel, and a gray scale value of the blue sub-pixel; and the temperature compensation coefficients comprise: a temperature compensation coefficient of the red sub-pixel, a temperature compensation coefficient of the green sub-pixel, and a temperature compensation coefficient of the blue sub-pixel.

5. The detection method according to claim 4, wherein the temperature compensation coefficient of the red sub-pixel, the temperature compensation coefficient of the green sub-pixel, and the temperature compensation coefficient of the blue sub-pixel are stored in a lookup table.

6. The detection method according to claim 4, wherein all gray scale values of the red sub-pixel correspond to a same lookup table of the temperature compensation coefficients; or
   different gray scale values of the red sub-pixel correspond to different lookup tables of the temperature compensation coefficients.

7. The detection method according to claim 4, wherein a group of gray scale values of the red sub-pixel correspond to a same lookup table of the temperature compensation coefficients.

8. The detection method according to claim 1, wherein the obtaining the temperature compensation coefficients comprises:
   obtaining luminous intensities of the display screen at a plurality of preset temperatures, wherein the display screen is in a state free from influence of the ambient light; and
   determining temperature compensation coefficients corresponding to the plurality of preset temperatures by taking the luminous intensity of the display screen at one of the plurality of preset temperatures as a reference luminous intensity and computing ratios of the luminous intensities of the display screen at the plurality of preset temperatures to the reference luminous intensity.

9. A method for detecting an intensity of ambient light applicable to an ambient light sensor, the ambient light sensor being provided below a display screen, the detection method comprising:
sensing a light intensity of incident light, wherein the incident light comprises ambient light passed through the display screen and light leaked from the display screen;
computing compensated display data based on display data of a target region of the display screen and a temperature compensation coefficient corresponding to a current temperature of the display screen, wherein the target region is a region of the display screen corresponding to the ambient light sensor, and the temperature compensation coefficient is indicative of a degree of influence of the current temperature of the display screen on a luminous intensity of the display screen;
computing a light intensity of the light leaked from the display screen based on the compensated display data; and
obtaining a light intensity of the ambient light passed through the display screen based on the light intensity of the incident light and the light intensity of the light leaked from the display screen.

10. The detection method according to claim 9, wherein the display pixel of the target region of the display screen comprises: a red sub-pixel, a green sub-pixel, and a blue sub-pixel; and the display data of the target region of the display screen comprises: a gray scale value of the red sub-pixel, a gray scale value of the green sub-pixel, and a gray scale value of the blue sub-pixel.

11. The detection method according to claim 9, wherein the computing the compensated display data based on the display data of the target region of the display screen and the temperature compensation coefficient corresponding to the current temperature of the display screen comprises: multiplying the display data of the target region of the display screen by the temperature compensation coefficient to obtain the compensated display data, wherein the temperature compensation coefficient is stored in a lookup table.

12. An electronic device, comprising:
a display screen;
an ambient light sensor provided below the display screen for sensing a light intensity of incident light, wherein the incident light comprises ambient light passed through the display screen and light leaked from the display screen; and
a processor configured to: obtain an estimated light intensity of the light leaked from the display screen based on display data of a target region of the display screen, wherein the target region is a region of the display screen corresponding to the ambient light sensor; compute an actual light intensity of the light leaked from the display screen based on the estimated light intensity and a temperature compensation coefficient corresponding to a current temperature of the display screen, wherein the temperature compensation coefficient is indicative of a degree of influence of the current temperature of the display screen on a luminous intensity of the display screen; and obtain a light intensity of the ambient light passed through the display screen based on the actual light intensity of the incident light and the light intensity of the light leaked from the display screen.

13. The electronic device according to claim 12, wherein the computing the actual light intensity of the light leaked from the display screen based on the estimated light intensity and the temperature compensation coefficient corresponding to the current temperature of the display screen comprises: multiplying the estimated light intensity by the temperature compensation coefficient to obtain the actual light intensity of the light leaked from the display screen.

14. The electronic device according to claim 12, wherein the display data of the target region of the display screen comprises: a gray scale value of a display pixel of the target region.

15. The electronic device according to claim 14, wherein the display pixel of the target region of the display screen comprises: a red sub-pixel, a green sub-pixel, and a blue sub-pixel; the display data of the target region of the display screen comprises: a gray scale value of the red sub-pixel, a gray scale value of the green sub-pixel, and a gray scale value of the blue sub-pixel; and the temperature compensation coefficients comprise: a temperature compensation coefficient of the red sub-pixel, a temperature compensation coefficient of the green sub-pixel, and a temperature compensation coefficient of the blue sub-pixel.

16. The electronic device according to claim 15, wherein the temperature compensation coefficient of the red sub-pixel, the temperature compensation coefficient of the green sub-pixel, and the temperature compensation coefficient of the blue sub-pixel are stored in a lookup table.

17. The electronic device according to claim 15, wherein all gray scale values of the red sub-pixel correspond to a same lookup table of the temperature compensation coefficients; or
different gray scale values of the red sub-pixel correspond to different lookup tables of the temperature compensation coefficients.

18. The electronic device according to claim 15, wherein a group of gray scale values of the red sub-pixel correspond to a same lookup table of the temperature compensation coefficients.

19. The electronic device according to claim 12, wherein the obtaining the temperature compensation coefficients comprises:
obtaining luminous intensities of the display screen at a plurality of preset temperatures, wherein the display screen is in a state free from influence of the ambient light; and
determining temperature compensation coefficients corresponding to the plurality of preset temperatures by taking the luminous intensity of the display screen at one of the plurality of preset temperatures as a reference luminous intensity and computing ratios of the luminous intensities of the display screen at the plurality of preset temperatures to the reference luminous intensity.

20. The electronic device according to claim 12, wherein the display screen is a LED display screen.

* * * * *